J. W. KOHLHEPP.
SIDE DISCHARGE CARCASS CLEANING MACHINE.
APPLICATION FILED JUNE 6, 1918.

1,323,638.

Patented Dec. 2, 1919.
5 SHEETS—SHEET 1.

Witnesses
Rudolph J. Berg
Charles Willis

Inventor
John W. Kohlhepp
By Charles Willis Atty.

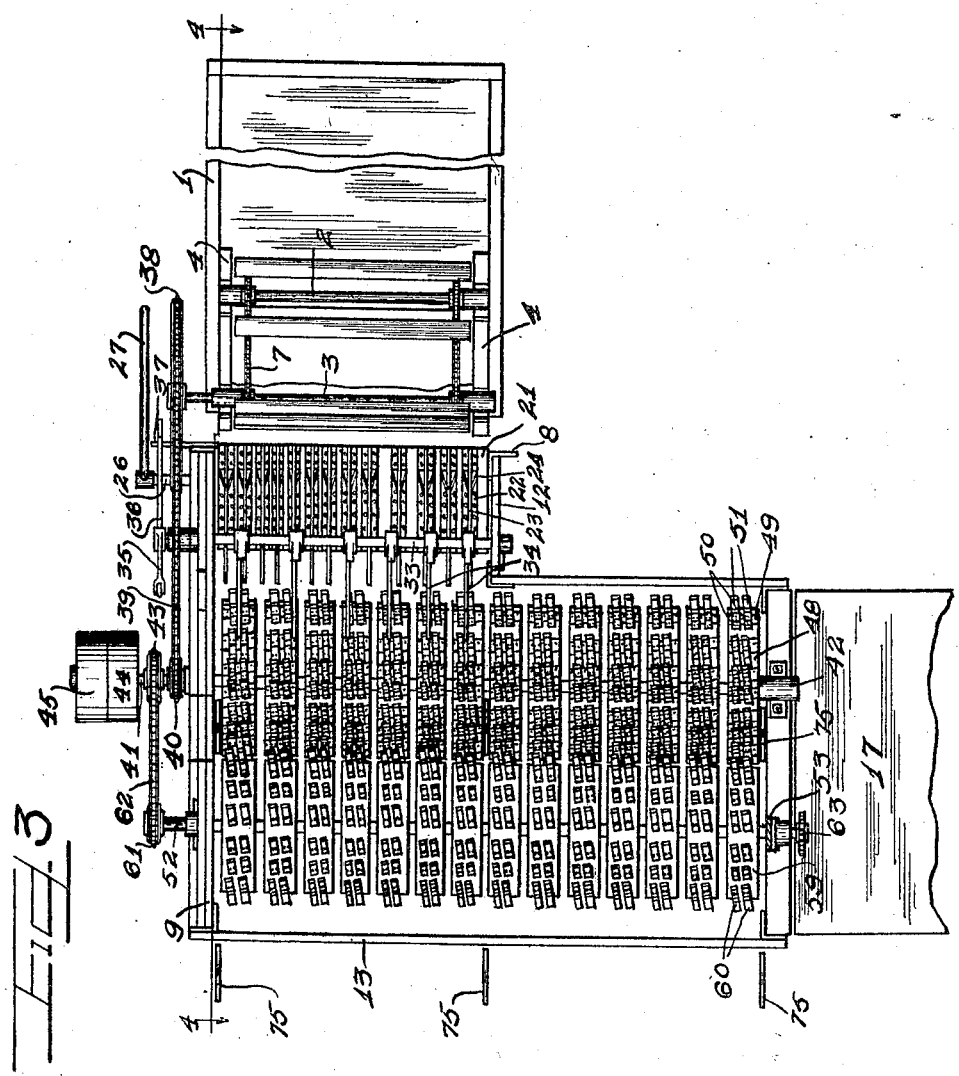

J. W. KOHLHEPP.
SIDE DISCHARGE CARCASS CLEANING MACHINE.
APPLICATION FILED JUNE 6, 1918.
1,323,638.
Patented Dec. 2, 1919.
5 SHEETS—SHEET 3.
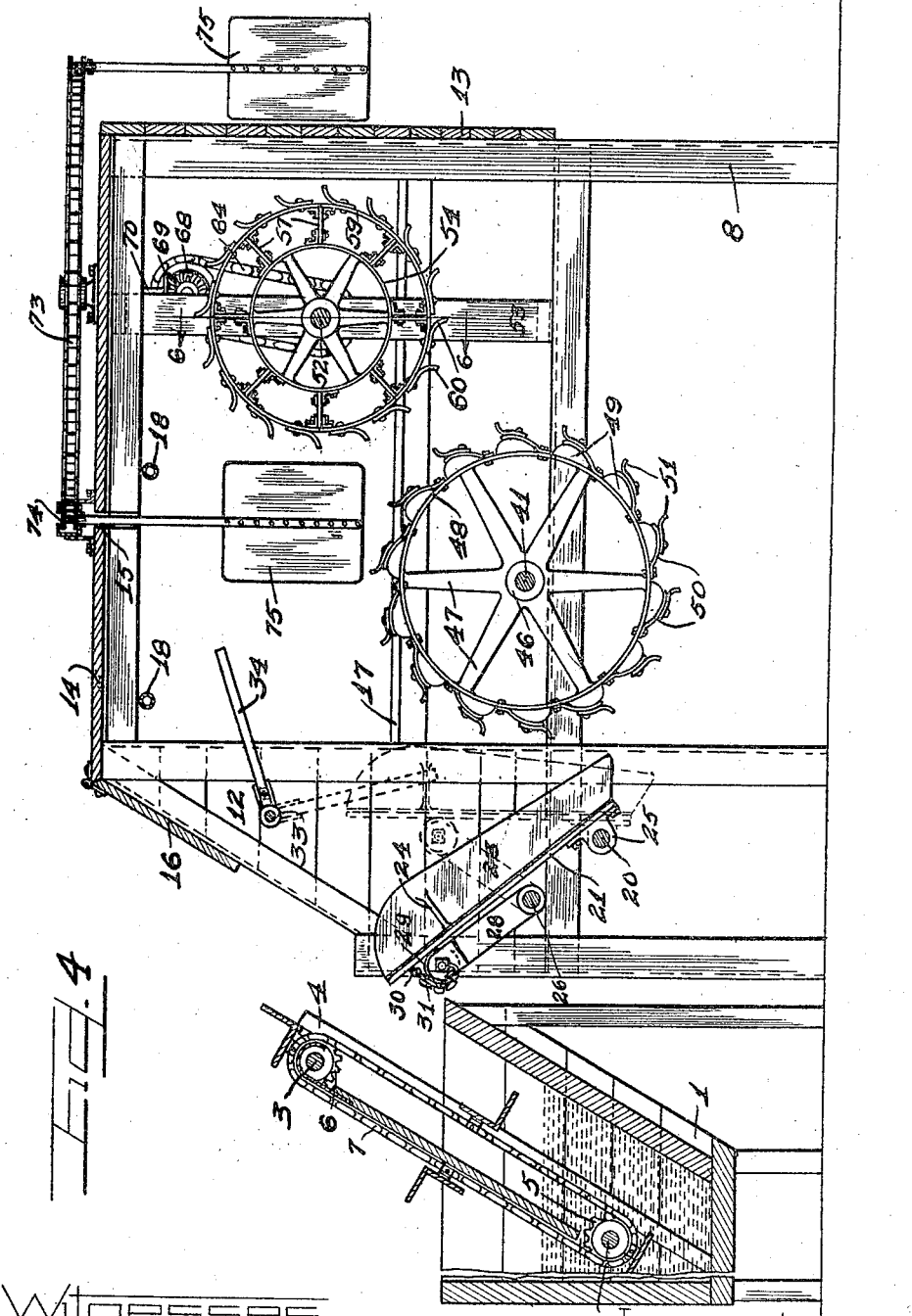

J. W. KOHLHEPP.
SIDE DISCHARGE CARCASS CLEANING MACHINE.
APPLICATION FILED JUNE 6, 1918.
1,323,638.
Patented Dec. 2, 1919.
5 SHEETS—SHEET 4.
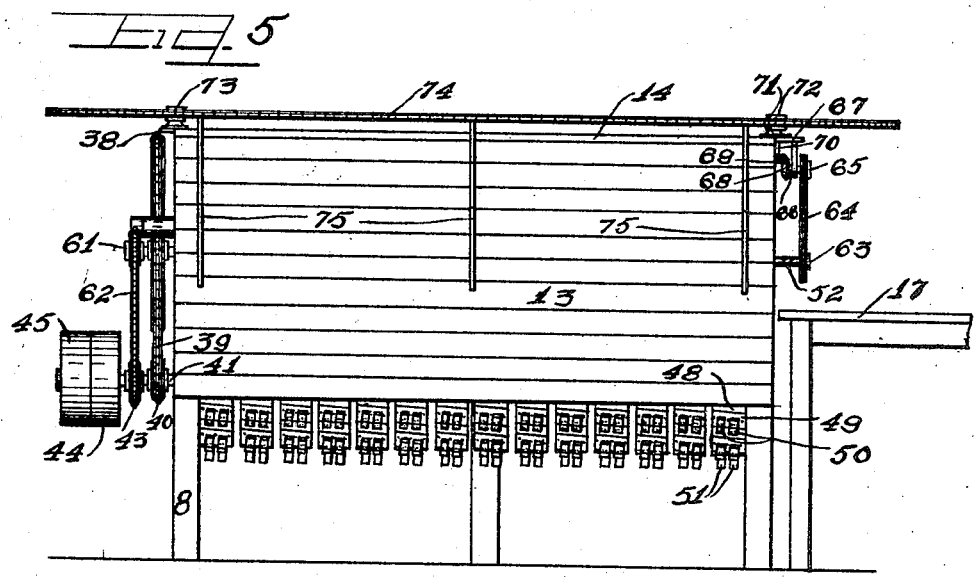
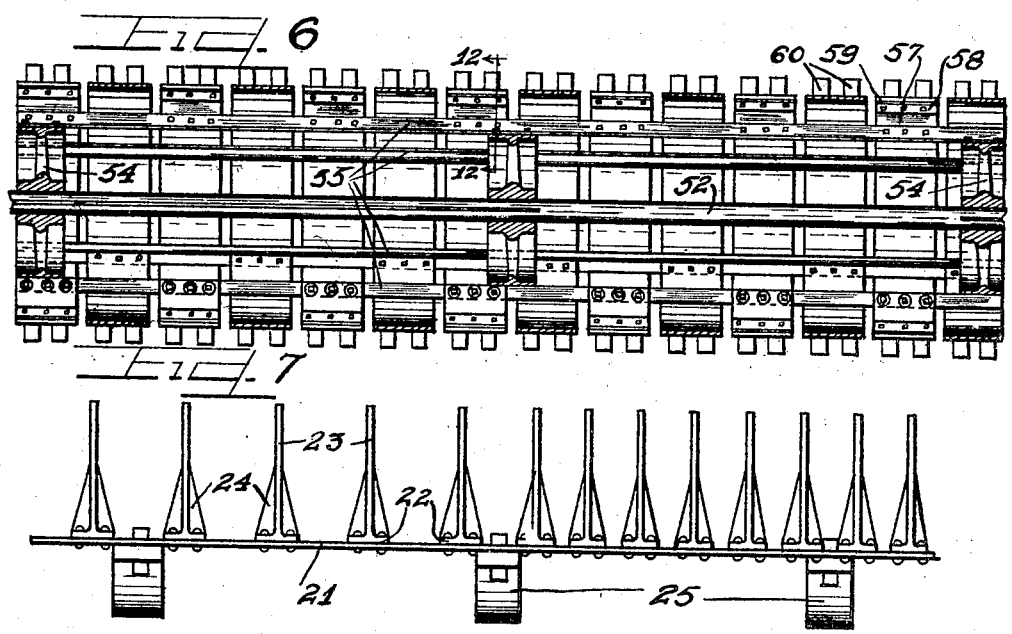

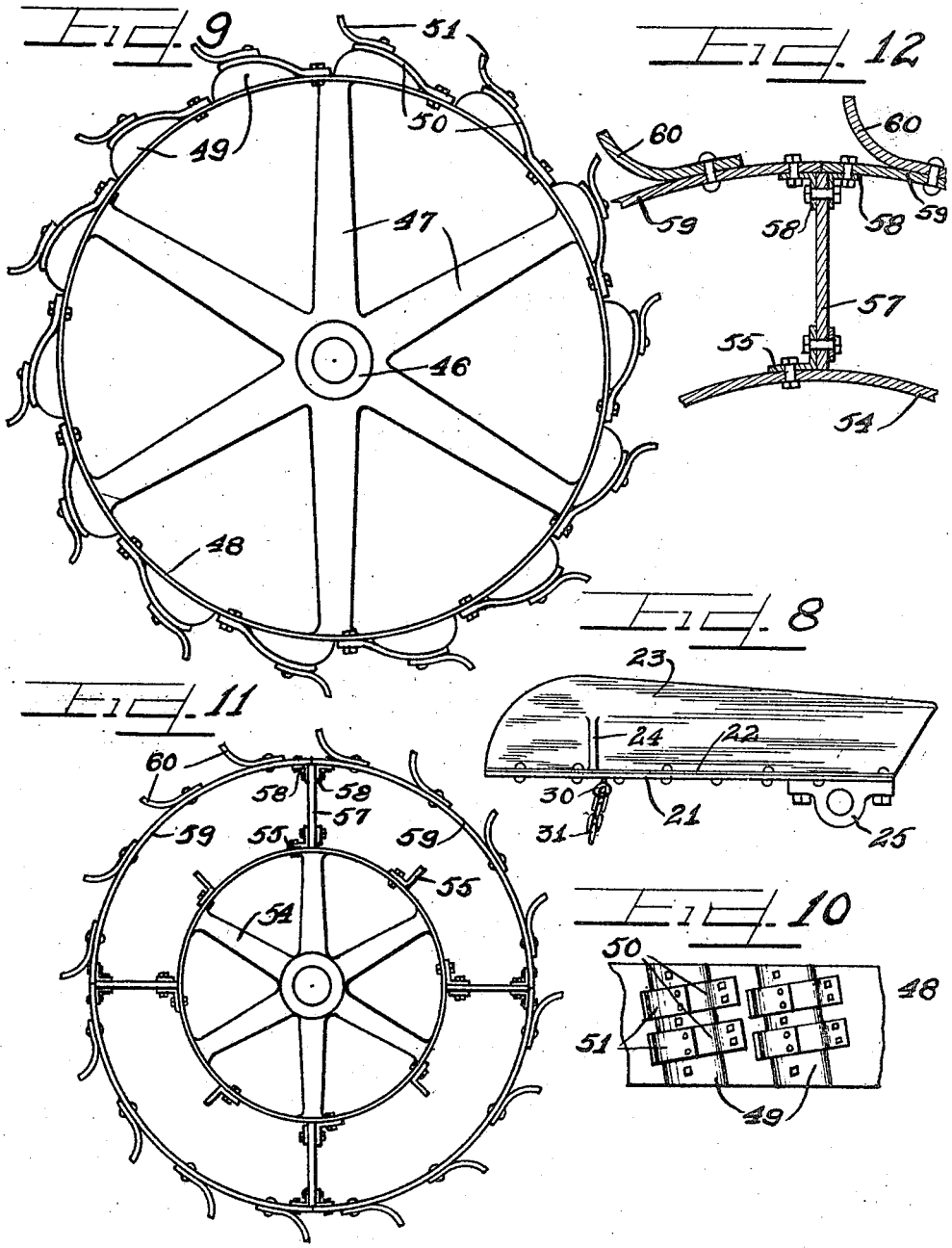

UNITED STATES PATENT OFFICE.

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

SIDE-DISCHARGE CARCASS-CLEANING MACHINE.

1,323,638.                  Specification of Letters Patent.        Patented Dec. 2, 1919.

Application filed June 6, 1918. Serial No. 238,475.

*To all whom it may concern:*

Be it known that I, JOHN W. KOHLHEPP, a citizen of the United States, and a resident of the city of Chicago, in the county of Cook and State of Illinois, have invented certain new and useful Improvements in Side-Discharge Carcass-Cleaning Machines; and I do hereby declare that the following is a full, clear, and exact description of the same, reference being had to the accompanying drawings, and to the numerals of reference marked thereon, which form a part of this specification.

This invention relates to an improved form of a side discharge carcass cleaning machine wherein a carcass entering on an adjustable chute is partially cleaned by means of a primary rotatable scraper drum which by an adjustment of the chute acts to elevate the carcass into a field of operation between said primary scraper drum and a rotatable secondary flexible scraper drum to be acted upon by traveling guides and by the drum scraper blades which are disposed at an angle on the peripheral surfaces of the scraper drums to cause rotation of the carcass and movement of the same longitudinally along said drums toward one end thereof to permit discharge of the cleaned carcass through an open side of the machine upon a discharge table.

It is an object of this invention to construct a carcass cleaning machine provided with scraping drums adapted to rotate and clean a carcass and move the same longitudinally of the drums to discharge position.

It is also an object of the invention to provide a silently operating sanitary carcass cleaning machine, the rotatable massaging mechanisms of which are adapted to move carcasses longitudinally thereacross to rotate and clean the carcasses and discharge the same when cleaned through the side of the machine.

Another object of the invention is the construction of a carcass dehairing machine wherein carcasses to be cleaned are guided and separated by means of chain driven paddles.

A further object of the invention is the construction of a carcass dehairing machine wherein carcasses to be cleaned are guided and separated by means of chain driven movable partitions as the carcasses are cleaned by scraping drums, the blades of which are disposed at an angle to rotatably feed the carcasses longitudinally across the drums to deliver the cleaned carcasses through one side of the machine.

It is furthermore an object of this invention to construct a carcass cleaning machine wherein the scraper drums are provided with flexible mountings for the scraper blades which are mounted at an angle to rotate and clean a carcass and gradually feed the same transversely across the machine between movable guide partitions to discharge the cleaned carcass through the side of the machine.

Another object of the invention is the construction of a carcass cleaning machine wherein a carcass is delivered into the front end of the machine upon an adjustable chute which supports the carcass in position to permit the same to be rotated and partially cleaned by a primary scraper drum which acts to elevate the carcass, when the chute is adjusted, to deliver the carcass into the field of operation of a secondary scraper drum which together with said primary scraper drum have the scraping blades thereof positioned at an angle to continue the cleaning of the carcass and feed the same longitudinally along the drums between movable guide paddles through an open side of the machine.

It is also an object of the invention to construct a carcass cleaning machine wherein paddles which move in a continuous path act as guides and separators for carcasses as they are longitudinally moved along rotatable scraping drums by the scraper blades thereof which are mounted at an angle on flexible mountings to cause discharge of the carcasses through the side of the machine.

It is an important object of the invention to construct a side discharge carcass cleaning machine wherein the scraper blades of cleaning drums are disposed at an angle on flexible mountings to rotate, scrape and feed carcasses longitudinally of the drums into discharge position between movable carcass separating guide members.

Other and further important objects of this invention will be apparent from the disclosures in the drawings and specification.

The invention (in a preferred form) is illustrated in the drawings and hereinafter more fully described.

On the drawings:

Fig. 3 is a top plan view of the machine with the top removed and with parts broken away.

Fig. 4 is a sectional view taken on line 4—4 of Fig. 3.

Fig. 5 is a rear elevation of the machine.

Fig. 6 is a detail section of the secondary flexible scraping drum taken on line 6—6 of Fig. 4, showing parts in elevation.

Fig. 7 is an end view of the adjustable carcass receiving chute.

Fig. 8 is a side view thereof.

Fig. 9 is an enlarged side view of one of the primary scraper drum wheels.

Fig. 10 is a fragmentary plan view of the rim thereof.

Fig. 11 is an enlarged end view of the secondary flexible scraper drum.

Fig. 12 is an enlarged fragmentary detail section taken on line 12—12 of Fig. 6.

As shown on the drawings:

Figure 1:
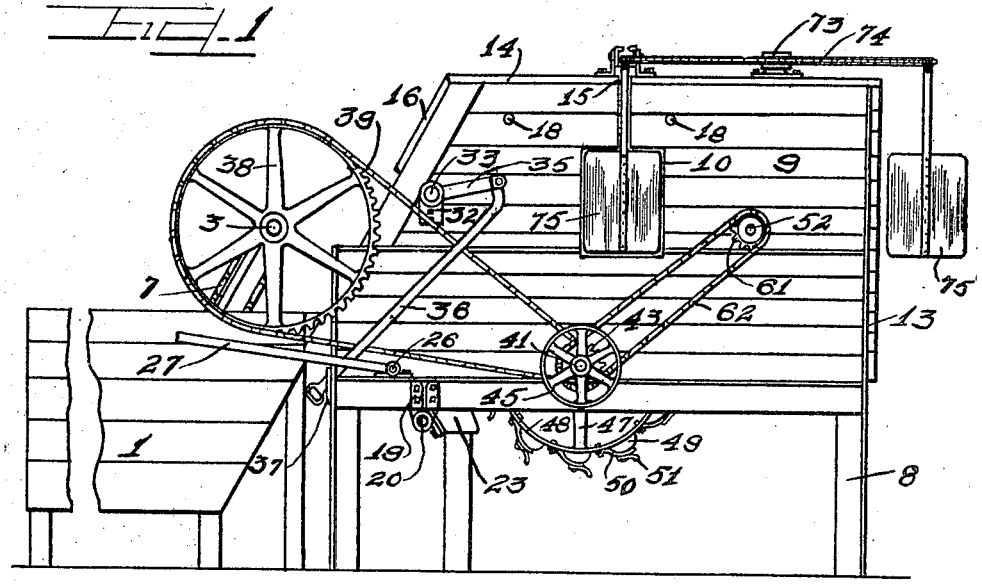
Figure 1 is a side elevation of the closed side of a carcass cleaning machine embodying the principles of this invention.
Figure 2:
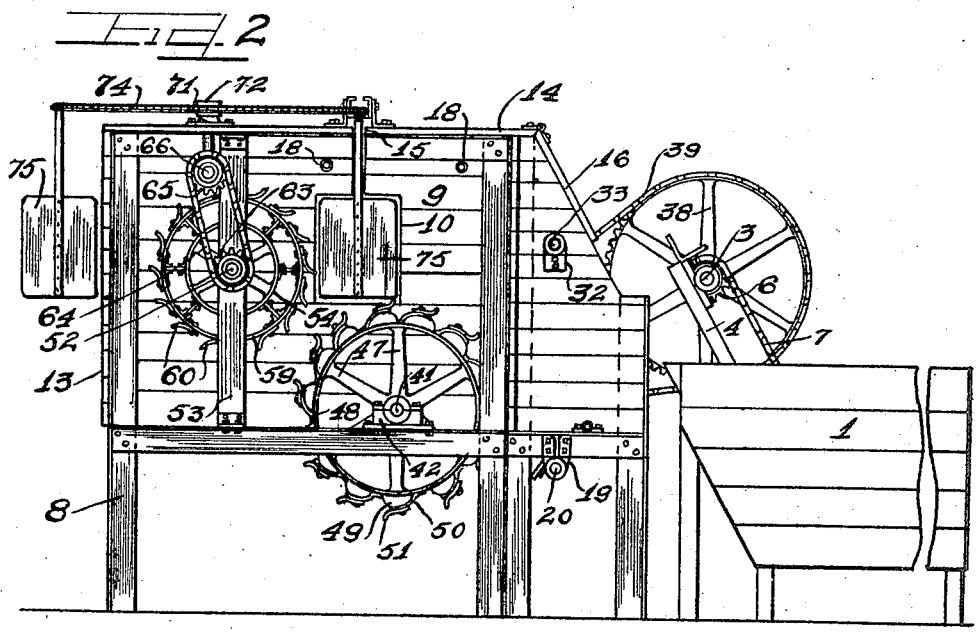
Fig. 2 is an elevational view of the open or discharge side of the machine.

The reference numeral 1 indicates a scalding vat disposed in front of the carcass cleaning machine. The scalding vat is provided with a lower shaft 2, journaled transversely within the vat, and an upper shaft 3, rotatably mounted above the vat on suitable supports 4. Secured on the shafts 2 and 3, are sprocket wheels 5 and 6, respectively, around which is trained a continuous conveyer 7, for delivering carcasses or hogs from the scalding vat to the cleaning and dehairing machine.

The cleaning machine comprises a framework 8, closed at one side by a casing side 9, made of wood or other suitable material and provided with a paddle opening 10. The opposite side of the cleaning machine is open to permit side discharge of cleaned carcasses. The cleaning machine is wider than the scalding vat, and formed on the front of the machine is a carcass receiving section of a width equal to that of the scalding vat. One side of the carcass receiving section is closed by the front portion of the side casing wall 9, while the other side of the receiving section is closed by means of a side wall 12. The machine is closed at the rear by a rear wall 13, and secured on top of the machine to close the same is a top 14, provided with a transverse slot or passage 15, which communicates with the paddle opening 10. Hingedly connected to one side of the front edge of the top 14, is a door 16, which closes the upper portion of the carcass receiving section. The machine is open at the bottom and front end and disposed adjacent the open discharge side is a platform 17, for receiving discharged carcasses. Mounted transversely in the upper portion of the cleaning machine are sprinkling or spraying devices 18, for spraying hot water on carcasses during the cleaning and dehairing process.

Rigidly secured on each side of the framework 8, near the front end of the cleaning machine is a downwardly projecting bearing bracket 19, for rotatably supporting the ends of a transverse axle or shaft 20, having the lower end of a carcass receiving rib apron, chute or grate secured thereon between the casing walls 9 and 12. The chute normally is inclined outwardly and upwardly toward the scalding vat 1, with the upper end thereof disposed below the upper end of the conveyer 7, to receive carcasses therefrom. The chute comprises a rectangular base plate 21, upon which are riveted or otherwise secured the flanges 22, of a plurality of longitudinally disposed spaced parallel ribs or T-bars the stems or plates 23, of which project upwardly at right angles to the base plate 21, and are reinforced by side webs 24, integrally connected between the flanges 22, and the stems 23, of said stem ribs and at right angles thereto. The stem plates 23, are rounded and of a greater depth near the upper end of the chute and gradually decrease in depth toward the lower end of the chute, where said stem plates 23, project beyond the lower edge of the base plate. Rigidly secured to the bottom of the lower margin of the chute base plate 21, are a plurality of apertured attaching brackets 25, which are keyed or otherwise secured on the rotatable chute shaft 20.

Rotatably mounted on one side of the framework 8, of the carcass receiving section, is a stub shaft 26, which projects into the machine underneath the chute base plate 21, and has keyed or otherwise secured on the outer extending end thereof, one end of a lever 27. The stub shaft 26, extends to about the center of the chute, and has keyed or otherwise secured to the inner end thereof one end of a lift or crank arm 28, having rotatably mounted on the other end thereof a roller 29, which engages the bottom surface of the chute base plate 21. Secured to the bottom of the base plate 21, is a screw eye 30, to which one end of a chain 31, is attached. The other end of the chain 31, is connected to the roller end of the crank arm 28, to afford a means whereby the chute may be returned to normal position after the same has been tipped or moved toward the rear end of the machine. The chain 31, also serves to limit the inward movement of the chute to prevent the same from striking against the primary scraping drum mechanism hereinafter described.

Secured on the outside of each of the walls 9 and 12, below the door 16, is a bearing bracket 32, for rotatably supporting the ends of a transverse axle or shaft 33, to which is rigidly secured a plurality of spaced parallel tines or arms 34, adapted to be moved into position to control the downward movement of carcasses on the receiving chute, to break the fall of said carcasses to prevent the same from falling with too great a force against the primary scraping drum mechanism. Keyed or otherwise secured on one end of the axle 33, on the outside of the machine is one end of a crank arm 35, to the other end of which is pivotally connected one end of a lever or handle 36, the other end of which is supported in a slotted plate extension 37, secured on one of the front corners of the framework 8.

Secured on the extending end of the upper conveyer shaft 3, is a large sprocket wheel 38, around which a driving chain 39, is trained. The chain 39, is also engaged around a sprocket gear 40, which is keyed or otherwise secured on the extending end of a driving or primary scraping drum shaft 41, which is transversely disposed in the machine, and is journaled in suitable bearings 42, mounted on the sides of the framework 8. Also secured on the shaft 41, to the outside of the sprocket gear 40, is a second sprocket gear 43. Secured on the projecting end of the shaft 41, beyond the sprocket gear 43, is a friction pulley 44, adapted to be connected by means of a belt to any suitable type of driving mechanism. An idler pulley 45, is rotatably mounted on the shaft 41, adjacent the driving pulley 44.

The main or primary, cleaning, scraping or massaging drum mechanism of the device comprises, as clearly shown in Figs. 3, 9 and 10, a plurality of adjacently disposed primary or main cleaning or scraping wheels which are keyed or otherwise secured on the shaft 41, within the machine to form a cylinder or drum scraper or cleaner. Each of the primary scraper wheels comprises a hub 46, radial spokes 47, integrally formed thereon and an integral flat rim 48. Rigidly secured at an angle to the sides of the wheel and circumferentially on the outer peripheral surface of the rim 48, are a plurality of parallel spaced resilient supports or cushions 49, made of rubber or other suitable material. Rigidly bolted or otherwise secured to the wheel rim 48, between each pair of cushions 49, are the lower ends of a number of parallel beater arms 50, the upper portions of which curve upwardly over the respective cushions 49, and at right angles thereto, and have rigidly secured on the upper ends thereof outwardly curved massaging or scraper blades 51. As clearly shown in Fig. 10, the scraper arms and blades 50 and 51, are disposed at an angle to the sides of the scraper wheels.

Mounted above and to the rear of the lower or primary scraping drum mechanism is a secondary or upper flexible scraping cylinder or drum mechanism embracing a shaft 52, which extends transversely through the machine and through supporting braces or uprights 53, secured to the framework 8. The secondary flexible scraping drum mechanism comprises, as clearly shown in Figs. 6, 11 and 12, a plurality of flat rim wheels 54, which are keyed or otherwise secured on the shaft 52, within the machine casing. Rigidly connecting the wheels 54, together are a plurality of spaced angle bars 55, which are disposed parallel to the shaft 52, and have the ends of one flange thereof removably secured to the rims of the wheels 54, by bolts or other suitable means while the other flange projects radially from the wheel rims. Rigidly but removably secured to the projecting flanges of the angle bars 55, are a plurality of adjacently disposed secondary flexible cleaning, massaging or scraping wheels, all of which are identical in construction and form a flexible scraping drum adapted to flex to conform to the bodies of carcasses. As shown in Fig. 6, alternate flexible scraping wheels are connected to alternate angle bars.

Each secondary flexible scraping wheel embraces a plurality of flexible radial arms or spokes 57, made of flexible belting or other suitable material and having the lower ends thereof removably secured to the radial flanges of alternate angle bars 55. Rigidly but removably secured on each side of the outer end of each of the flexible arms or spokes 57, are the radial flanges of oppositely directed angle braces 58. Secured rigidly to the peripheral flanges of the angle braces 58, at the outer ends of the flexible spokes 57, are flexible rim strips or sections 59, made of flexible belting or other suitable material. The strips 59, form the rims of the flexible wheels, and each strip 59, has rigidly secured on the outer surface thereof a plurality of peripherally disposed metal scraper blades 60, mounted at an angle with respect to the sides of the flexible wheels, and having the free ends thereof curved outwardly.

Keyed or otherwise secured on one extending end of the shaft 52, to the outside of the side wall 9, is a sprocket gear 61, which is disposed in the plane of the sprocket gear 43, and has trained therearound a continuous chain 62, which is also engaged around the sprocket gear 43, to impart a drive from the shaft 41 to the shaft 52. Secured on the other extending end of the shaft 52, is a sprocket gear 63, around which is engaged a continuous chain 64, which is also trained around a sprocket gear 65, secured on the outer end of a stub shaft 66, rotatably supported in a bracket 67, secured to the upper portion of the framework 8, at the open side of the machine. Keyed or otherwise secured on the inner end of the stub shaft 66, is a bevel pinion 68, which is in mesh with a bevel pinion 69, securely engaged on the lower end of a vertical axle 70, which is journaled in a suitable bearing 71, mounted on top of the machine. The axle 70, projects upwardly through the top 14, and has secured on the upper projecting end thereof a large horizontally disposed sprocket wheel 72. Rotatably mounted upon the top 14, above the closed side of the machine and directly opposite the sprocket wheel 72, is another large horizontally mounted sprocket wheel 73. The large sprocket wheels 72 and 73, are of a diameter sufficient to extend beyond the sides and rear wall of the machine casing and have trained therearound a continuous chain 74, from which is suspended a plurality of depending or hanging guide separators, partitions or paddles 75, adapted to travel around in a continuous path transversely through the machine and around the back thereof when the chain 74, is caused to rotate by operating the large sprocket wheels 72 and 73. As clearly shown in Figs. 1 and 4, the guide paddles 75, when passing transversely through the machine are disposed above the primary scraping drum and in front of the flexible secondary scraping drum and move longitudinally with respect to said drums. The opening 10, in the wall 9, and the slot 15, in the top 14, permit passage of the paddles through the machine.

The operation is as follows:

The machine is set in operation by slipping the power belt from the idler pulley 45, to the driving pulley 44, thereby causing rotation of the primary scraping drum, the scalding vat conveyer, the secondary scraping drum and the paddle chain 74, through the respective driving gears and chains.

A carcass after being scalded in the scalding vat 1, is pushed onto the elevating conveyer 7, and is delivered to the pivoted chute, the stem plates 23, of which receive the carcass, which slide downwardly thereon into the field of operation of the primary scraping drum which acts thereon to rotate and scrape the carcass, while in the receiving section of the machine. The entrance of a carcass into the machine after delivery by the conveyer 7, is controlled by the fall breaking mechanism which is manually operated by pulling forwardly on the lever 36, thereby swinging the arms 34, downwardly toward the chute to engage an entering carcass to break the fall thereof to prevent the carcass from striking against the primary scraping drum with too much force. By proper adjustment of the fall breaking mechanism the entrance of carcasses of different sizes may be readily controlled by an operator positioned to operate the lever 36.

A carcass falling into the receiving section of the machine and into beating position between the lower portion of the chute and the scraping wheels of the primary or lower scraping drum, is rotated by the wheels, the scraping blades 51, of the cushioned scraping arms acting to clean, massage and scrape the carcass to clean and dehair the same by the continuous operation of the primary drum, the resilient cushions 49, of which, permit sufficient flexing of the scraper arms 50, to conform to the shape of the carcass to clean all parts thereof. The spraying device 18, is for sprinkling hot water upon the carcass as it is scraped and massaged.

When a carcass in the receiving section of the machine has been partly cleaned by the primary scraping drum, the operator lifts the lever 27, into an elevated position, thereby simultaneously moving the crank arm 28, the roller 29, of which rolls on the bottom of the chute to swing the same inwardly toward the primary scraping drum, as shown in dotted lines in Fig. 4, to reduce the space between said chute and primary drum. The movement of the chute toward the primary scraping drum is limited by the chain 31, which also acts to pull the chute back into normal position when the lever 27, is pulled forwardly toward the scalding vat. The continuous revolving action of the primary scraping drum gradually forces the partially cleaned carcass upwardly in the machine against the chute, and when sufficiently elevated, the primary drum causes the carcass to be carried by centrifugal force upwardly thereover into the field of operation of both the primary scraping drum and the rotating secondary flexible scraping drum. The rotation of both drums causes rotation of the carcass and due to the arrangement of the peripheral scraper blades 51 and 60, which are disposed at an angle with respect to the ends of the drums, said carcass while being rotated and acted upon by the blades which clean and scrape the same, is also advanced or fed longitudinally across the lower drum and in front of the upper drum by the action of the angled scraper blades.

The guide paddles 75, of course move in a continuous path laterally through and around the rear portion of the machine, and the carcass in its upper position in the machine is disposed between two of said paddles which act to guide the carcass and also serve as a means for separating the same from other carcasses should more than one carcass be disposed in the field of operation of both of the drums at the same time. The continuous transverse movement of the paddles 75, longitudinally across the top of the lower drum and in front of the upper drum assist the carcass in its transverse movement through the machine toward the open or discharge side, as said carcass is being rotated and completely cleaned by the action of the scraping blades. The upper rear spraying device 18, acts to sprinkle hot water on the carcass as it is advanced through the machine toward discharge position to thoroughly wash the carcass. When the cleaned carcass has been advanced laterally through the machine from the closed to the open side thereof, the cleaned carcass is discharged through the open side of the machine and falls upon the receiving table 17, from where it is removed by any suitable means.

It will thus be seen that when a carcass between the chute and the primary scraping drum is partially cleaned and the chute is tipped toward the primary drum that the carcass will be conveyed or elevated from the receiving section of the machine by the primary drum into the field of operation of both the drums and between two of the guide paddles 75. By then returning the chute to normal position another carcass may be lowered into the initial cleaning position and be acted upon by the primary drum at the same time that the first carcass is being acted upon and advanced transversely through the machine toward discharge position by both of the cleaning drums. A plurality of carcasses if desired may be elevated into the field of operation of both of the scraping drums. Said carcasses are guided transversely through the machine and are kept separated from one another by the moving paddles 75, as the flexibly mounted angled beater blades act to clean, dehair, rotate and also advance the carcasses longitudinally of the drums to discharge the cleaned carcasses through the open side of the machine.

The upper or secondary scraping drum is flexible and flexes to conform to the shape of the carcasses as they are moved into engagement therewith by the action of the primary scraping drum. Due to the simultaneous revolving action of the scraping drums which are parallel and spaced from one another, the carcasses are prevented from passing therebetween and are movably positioned in the field of operation above the primary drum and in front of the secondary drum.

I am aware that numerous changes may be made and various details of construction may be varied without departing from the principles of this invention, and I therefore do not purpose limiting the patent granted, otherwise than necessitated by the prior art.

I claim as my invention:—

1. A carcass cleaning machine embracing flexible rotatable scraping drums adapted to clean and move a carcass longitudinally thereacross.

2. A carcass dehairing machine comprising horizontally rotatable drums, and scrapers mounted thereon at an angle with respect to the ends of the drums adapted to dehair and move a carcass longitudinally across said drums to discharge position through the side of the machine.

3. A carcass cleaning machine comprising a casing open at one side, simultaneously rotatable drums therein extending transversely of the machine, pivoted means for bringing a carcass into the field of operation of said drum and cleaning mechanisms mounted on said drums at an angle with respect to the ends thereof adapted to rotate, scrape and move a carcass longitudinally across said drums and transversely through the casing to discharge the cleaned carcass through the open side of said casing.

4. A carcass cleaning machine comprising flexible rotatable scraping drums adapted to clean a carcass and move the same transversely through the machine to discharge position.

5. A carcass cleaning machine comprising rotatable scraping drums, massaging means mounted thereon at an angle with respect to the ends of said drums adapted to rotate, dehair and move carcasses longitudinally across said drums toward discharge position, and means movable parallel to the axes of said drum for guiding and separating said carcasses during their transverse movement through the machine.

6. In a carcass cleaning machine of the class described the combination with rotatable scraping drums, and means movable transversely of the machine for guiding and separating carcasses as they are acted upon and advanced through the machine by said drums.

7. In a carcass cleaning machine of the class described the combination with a plurality of rotatable scraping drums, of pivoted means co-acting with one of said drums to cause carcasses to be partially cleaned thereby and then elevated thereby into the field of operation of all of said drums, said drums adapted to rotate, dehair and advance the elevated carcasses longitudinally thereacross to discharge position, and means adapted to move longitudinally across said drums for guiding and separating the carcasses as they are acted upon by said drums.

8. In a carcass cleaning machine a plurality of rotatable drums, adjustable means co-acting with one of said drums to cause carcasses to be first partially cleaned thereby and then elevated by said drum into the field of operation of all of said drums, scraper means mounted on said drums at an angle with respect to the ends thereof adapted to rotate, dehair and advance the elevated carcasses transversely through the machine to discharge said carcasses through the side of said machine, and means moving transversely through the machine to guide and separate the elevated carcasses while in the field of operation of all of said drums.

9. In a carcass dehairing machine of the class described, rotatable scraping cylinders, carcass receiving means associated therewith to cause carcasses to be partially cleaned by one of said cylinders, means for adjusting said receiving means to cause said cylinder to move the carcasses into the field of operation of all of said cylinders to be further cleaned and moved transversely through the machine to discharge position, and means rotatable with said cylinders adapted to guide and separate the carcasses while in the field of operation of all of said cylinders.

10. A carcass cleaning machine embracing flexible rotatable scraper wheels adapted to clean and discharge a carcass through the side of the machine, and means movable longitudinally of said wheels to guide the carcass transversely through the machine.

11. A carcass cleaning machine embracing a rotatable primary scraping drum, a rotatable secondary scraping drum associated therewith, said drums adapted to simultaneously act on carcasses to rotate, clean and move the carcasses transversely through the machine to discharge the carcasses through one side of the machine, and means movable around said rotatable secondary scraping drum adapted to guide and separate the carcasses while in the field of operation of said drums.

12. In a carcass dehairing machine of the class described, scraping means for rotating, dehairing and advancing carcasses, and independent guide means movable transversely of the machine and across said scraping means for separating the carcasses while in the field of operation of said scraping means.

13. A carcass cleaning machine embracing a primary scraping drum, a secondary scraping drum, guide means, and means for simultaneously operating said drums and said guide means to cause carcasses disposed in the field of operation of said drums to be rotated, cleaned and advanced through the machine thereby, said guide means acting to separate said carcasses while in the field of operation of said drums.

14. A carcass cleaning machine embracing a primary and a secondary rotatable scraping drum, an adjustable carcass receiving chute associated with said primary drum adapted to support a carcass to permit the same to be acted upon by said primary drum, means for adjusting said chute to cause the primary drum to elevate and move the carcass into the field of operation of both the primary and secondary drums to be further cleaned and advanced thereby transversely through the machine to be discharged through the side thereof, and movable paddle means for guiding the carcasses through the field of operation of said primary and secondary drums.

15. A carcass cleaning machine embracing a primary and a secondary rotatable drum, scraper means disposed at an angle on the peripheral surfaces of said drums adapted to dehair, rotate and advance carcasses longitudinally across said drums to discharge position through the side of said machine, and continuously rotatable means adapted to move through the machine and around the rear portion thereof to guide and separate the carcasses while in the field of operation of said drums.

16. The combination with a scalding vat, of a conveyer therein, a cleaning machine associated with said scalding vat, an adjustable carcass receiving chute in said machine, a primary and a secondary scraping drum mounted within said machine, carcass guide means connected with said machine, means for simultaneously operating said conveyer, guide means and drums to permit a carcass to be elevated by said conveyer and deposited on said chute to be acted upon by said primary drum and means for adjusting said chute to cause the primary drum to elevate the partially cleaned carcass into the field of operation of both of said drums to be further cleaned thereby and advance transversely through the machine to be discharged through the side thereof, said guide means acting to guide the carcass while in the field of operation of both of said drums.

17. In a carcass cleaning machine the combination with a plurality of rotatable scraping drums, of pivoted means co-acting with one of said drums to cause carcasses to be partially cleaned thereby and then elevated thereby into the field of operation of all of said drums, said drums adapted to rotate, dehair and advance the elevated carcasses longitudinally thereacross to discharge position.

18. In a carcass cleaning machine a plurality of rotatable means co-acting with one of said drums to cause carcasses to be first partially cleaned thereby and then elevated by said drum into the field of operation of all of said drums, and scraper means mounted on said drums at an angle with respect to the ends thereof adapted to rotate, dehair and advance the elevated carcasses transversely through the machine to discharge said carcasses through the side of said machine.

19. A carcass cleaning machine embracing a primary and a secondary rotatable drum, and scraper means disposed at an angle on the peripheral surfaces of said drums adapted to dehair, rotate and advance carcasses longitudinally across said drums to discharge position through the side of the machine.

20. The combination with a carcass cleaning machine, of cleaning drums mounted therein, and a plurality of scraper blades disposed at an angle on the peripheral surfaces of said drums.

In testimony whereof I have hereunto subscribed my name in the presence of two subscribing witnesses.

JOHN W. KOHLHEPP.

Witnesses:
FRED E. PAESLER,
FRANK A. BREMER, Jr.